(12) United States Patent
El Tahry et al.

(10) Patent No.: US 6,467,373 B1
(45) Date of Patent: Oct. 22, 2002

(54) FLEXIBLE CONNECTING ROD

(75) Inventors: Sherif Hussein El Tahry, Troy; Chin-Hsiu Li, Bloomfield Hills, both of MI (US)

(73) Assignee: General Motors Corporation, Detroit, MI (US)

( * ) Notice: Subject to any disclaimer, the term of this patent is extended or adjusted under 35 U.S.C. 154(b) by 5 days.

(21) Appl. No.: 09/676,572

(22) Filed: Oct. 2, 2000

(51) Int. Cl.[7] .................................................. G05G 1/00
(52) U.S. Cl. .................. 74/579 E; 123/78 E; 123/48 B; 74/583
(58) Field of Search ..................... 74/581, 582, 579 E, 74/583, 579 R; 123/48 B, 48 R, 78 E, 311, 197.3, 197.4, 197.1

(56) References Cited

U.S. PATENT DOCUMENTS

| | | | | |
|---|---|---|---|---|
| 1,301,441 A | * | 4/1919 | Howe et al. | 123/78 E |
| 2,217,721 A | * | 10/1940 | Anthony | 123/78 E |
| 2,248,323 A | * | 7/1941 | Anthony | 123/78 E |
| 5,724,863 A | * | 3/1998 | Kramer et al. | 74/583 |
| 6,223,703 B1 | * | 5/2001 | Galvin | 123/48 B |

* cited by examiner

Primary Examiner—David A. Bucci
Assistant Examiner—Justin Stefanon
(74) Attorney, Agent, or Firm—Kathryn A. Marra

(57) ABSTRACT

An internal combustion engine has a connecting rod which interconnects the engine crankshaft with a piston. The connecting rod is a flexible member which has one section connected with the piston and another section connected with the crankshaft and a spring or lost motion member interconnecting the two sections. When the forces imposed on the flexible connecting rod are sufficiently high, the spring member will permit the two sections to approach each other, thereby shortening the length of the flexible connecting rod and increasing the volume in a combustion chamber formed between the piston and an engine cylinder in which it is reciprocably disposed.

1 Claim, 1 Drawing Sheet

FLEXIBLE CONNECTING ROD

TECHNICAL FIELD

This invention relates to internal combustion engines having variable compression ratio mechanisms incorporated therein.

BACKGROUND OF THE INVENTION

The compression ratio of an internal combustion engine is one design factor that impacts the thermal efficiency of the engine. Under ideal conditions, the thermal efficiency increases as the compression ratio increases. However, with spark ignition engines, the maximum levels of compression ratio that can be utilized are limited by engine knock.

Engine knock is most likely to occur at higher loads where the cylinder pressures are at their highest. These high loads therefore limit the amount of compression ratio or the compression ratio levels that are usable within an engine. With a constant compression ratio, this, of course, limits the efficiency that can be achieved at lower loads where without restriction the higher compression ratios could be utilized.

SUMMARY OF THE INVENTION

It is an object of this invention to provide an improved connecting rod for use in an internal combustion engine.

In one aspect of the invention, the connecting rod has a small end which is adapted to connect with a piston and a large end which is adapted to connect with a crankshaft, and an intermediate section in which a spring member is employed.

In another aspect of the present invention, the spring member permits the smaller section to be displaced toward the larger section when loads on the piston are increased above a predetermined value.

In another aspect of the present invention, a pin member joins the opposite smaller and larger sections and the spring member is circumjacent the pin member and imposes a separating load between the smaller and larger sections.

In a further aspect of the present invention, the smaller connecting rod section and the larger connecting rod section are joined by a sleeve member surrounding the outer periphery thereof and are operatively connected by spring members disposed within the sleeve immediate the small connecting rod section and the large connecting rod section.

In yet a further aspect of the present invention, the spring member provides a lost motion connection between the ends of the connecting rod.

DESCRIPTION OF AN EXEMPLARY EMBODIMENT

Figure 1:
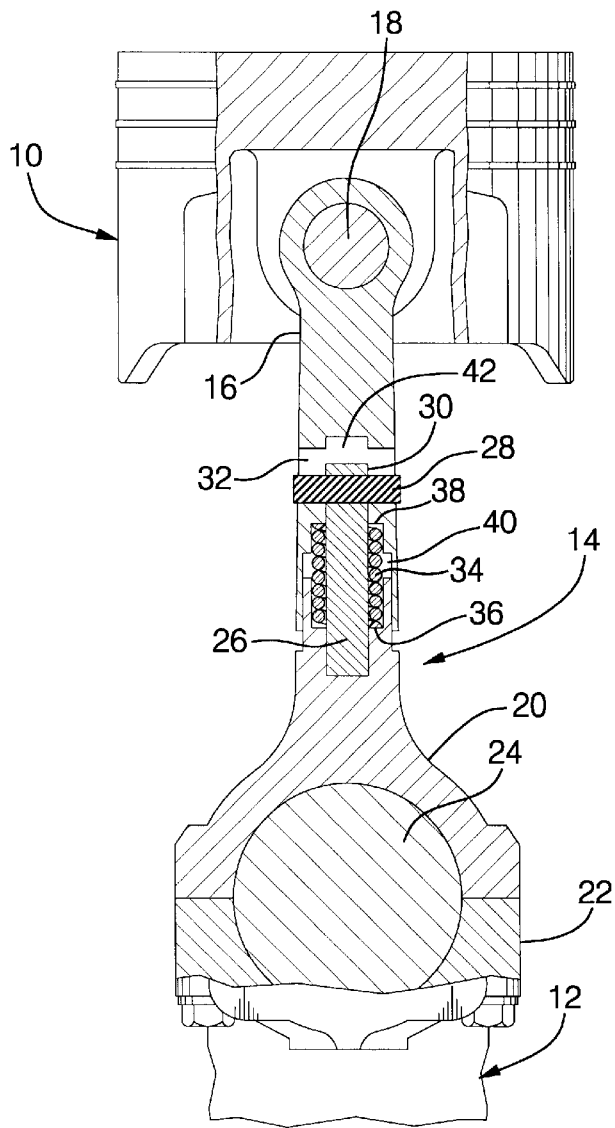
FIG. 1 is a cross-sectional elevational view of a portion of an engine having a connecting rod incorporating the present invention.

Referring to the drawings, there is seen in FIG. 1 an engine piston 10, an engine crankshaft 12 and a piston connecting rod 14 interconnecting the piston 10 with the crankshaft 12. The connecting rod 14 has a first or small end section 16 that is connected with the piston 10 by a piston pin or wrist pin 18. The rod 14 has a second or larger section 20 which has an end cap 22 cooperating therewith to surround a portion 24 of the crankshaft 12.

The small section 16 and large section 20 are interconnected by a first pin 26 disposed longitudinally relative to the connecting rod 14 and a second pin 28 engaging an opening 30 formed in the first pin 26 and extending transversely to the connecting rod 14. The pin 28 is disposed within a slot 32 formed in the small section 16.

A spring member 34 is disposed circumjacent the pin 26 and has a first end 36 abutting the large section 20 and a second end 38 abutting the small section 16. The spring 34 is a compression spring which in the "at rest" position attempts to separate the larger and smaller sections of the connecting rod 14. This creates a space 40 between the smaller section 16 and the larger section 20 and also a space 42 between the pin 26 and the smaller section 16.

When the crankshaft 12 is rotated, the piston 10 reciprocates in a cylinder bore, not shown. As is well known, the piston and cylinder bore serve to trap or encase a fuel/air mixture which is utilized during the combustion process of the engine. As the piston 10 is driven into the cylinder bore, the volume of the cylinder bore or combustion chamber decreases such that the pressure therein increases. This imposes a load upon the piston 10.

The combustion chamber or the volume of the cylinder above the piston has a maximum value when the piston is at bottom dead center and a minimum value when the piston is at top dead center. The ratio of these two volumes is the compression ratio of the engine. The fuel utilized in the engine is sensitive to the compression ratio. The higher the compression ratio, the lower the fuel consumption. However, to avoid knock at high loads, the compression ratio has to be relatively small. At lower loads, there are fewer propensities to knock, and hence the compression ratio can be made larger.

When the load on the piston 10 increases above a predetermined amount, the piston 10 will urge the small section 16 toward the large section 20 overcoming the force in the spring 34. The pin 28 permits the small section 16 to move relative to the large section, thereby decreasing both the space 40 and the space 42. The spring 34 permits "lost motion" between the sections 12 and 20 of the connecting rod 14. As the piston is moved toward the larger section, the volume of the combustion chamber, of course, does not diminish as rapidly. Thus, the compression ratio is reduced under higher loads. For example, the engine combustion chamber might have a compression ratio of 20 when the spring 34 is in its "at rest" or preloaded position and a compression ratio of 10 when the spring 34 is more fully compressed between the small section 16 and the large section 20. Most of today's spark ignition type engines can operate quite satisfactorily under heavy loads at a compression ratio of 10:1 without having engine knock present, but cannot operate knock-free at a compression ratio of 20.

Figure 2:
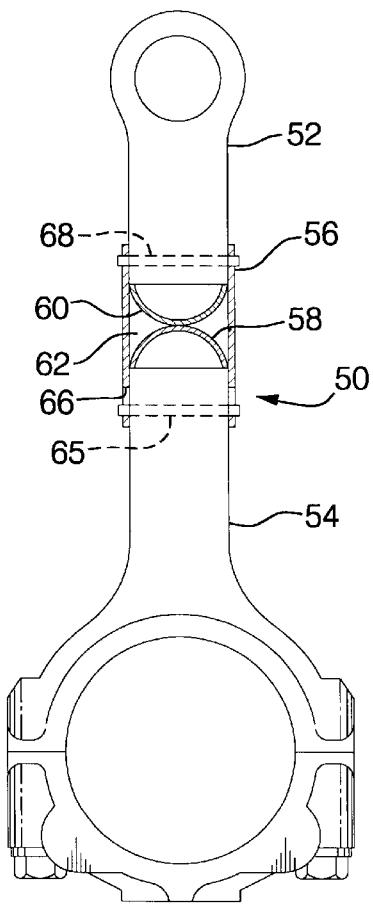
FIG. 2 is an elevational view of an alternative embodiment of the present invention.

An alternative embodiment, shown in FIG. 2, includes a flexible connecting rod 50 incorporating a small rod section 52 and a large rod section 54. The large rod section 54 is like the rod section 20 adapted to encase or enclose a portion of an engine crankshaft. The small section 52 has an opening which will readily accept the piston pin of a piston, not shown.

The large section 54 and small section 52 are joined by a sleeve 56 which surrounds the outer periphery of the sections 52 and 54, thereby limiting the amount of separation that can occur between these two sections. A pair of leaf springs 58 and 60 is disposed in a space 62 formed between the small section 52 and the large section 54. The opening of the space is, as previously suggested, limited by the sleeve 56. Thus, the "at rest" or preload force within the springs is established. The first pin 65 and the second pin 68 interconnect the small section 52 and larger section 54. The first pin 65 is fitted in the large end 54 and is disposed within a slot 66 formed in the sleeve 56.

With the connecting rod 50 shown in FIG. 2, as the load on the piston increases, the smaller section 52 can traverse toward the larger section 54, further compressing the springs 58 and 60 (lost motion permitted by the springs 58 and 60) while at the same time increasing the size or volume of the combustion chamber of the engine. This embodiment of FIG. 2 will also permit high compression ratios at low engine loads and lower compression ratios at high engine loads.

By controlling the spring loads within the flexible connecting rods, another application is possible with the present invention. The flexible connecting rods 14 and 50 can be utilized with a homogeneous charge compression ignited engine (HCCI). As is well known, the HCCI engine has the potential for achieving diesel-like efficiencies, while significantly reducing nitric oxide and soot emissions. There is a challenge with the HCCI engine that involves the controlling of engine combustion.

The flexible connecting rod will assist in combustion control by providing high compression ratios when needed to ignite the fuel charge near the top dead center of compression and reducing the high pressure rise when the combustion starts. This is what is needed with HCCI engines. By setting the "at rest" or the preload of the springs 34, 58 and 60 at sufficiently high levels, the flexible connecting rods 14 and 50 can support the high compression ratio needed to encourage combustion. However, as the gases combust, the pressure in the cylinder increases rapidly, which will impose further loads on the springs 34, 58 and 60 which (due to the lost motion) permit the combustion chamber to expand more rapidly than a solid connection would, thereby providing a better control of the combustion within the engine cylinder.

What is claimed is:

1. A flexible connecting rod for use in internal combustion engines having a crankshaft and a piston, said flexible connecting rod comprising:

a first connecting rod section adapted to be connected with a piston;

a second connecting rod section adapted to be connected with a crankshaft;

a lost motion connection incorporated between said first section and said second section which will permit said connecting rod to decrease in length as a load imposed thereon increases above a predetermined value:

said lost motion mechanism incorporating a sleeve member surrounding the outer periphery of a portion of each of said first and second connecting rod sections and limiting the displacement of said connecting rod sections away from each other and permitting sufficient separation to form a cavity between said first and second connecting rod sections; and a pair of spring members disposed within said cavity, one of said spring members abutting the first connecting rod section and the other of said spring members abutting the second connecting rod section and said cavity being sufficiently small such that the spring members abut each other and are compressed within the cavity to urge separation of the first connecting rod section from the second connecting rod section but permit closing or reducing of the cavity size when a load is imposed on the flexible connecting rod with sufficient force to overcome the force within the springs.

\* \* \* \* \*